UNITED STATES PATENT OFFICE.

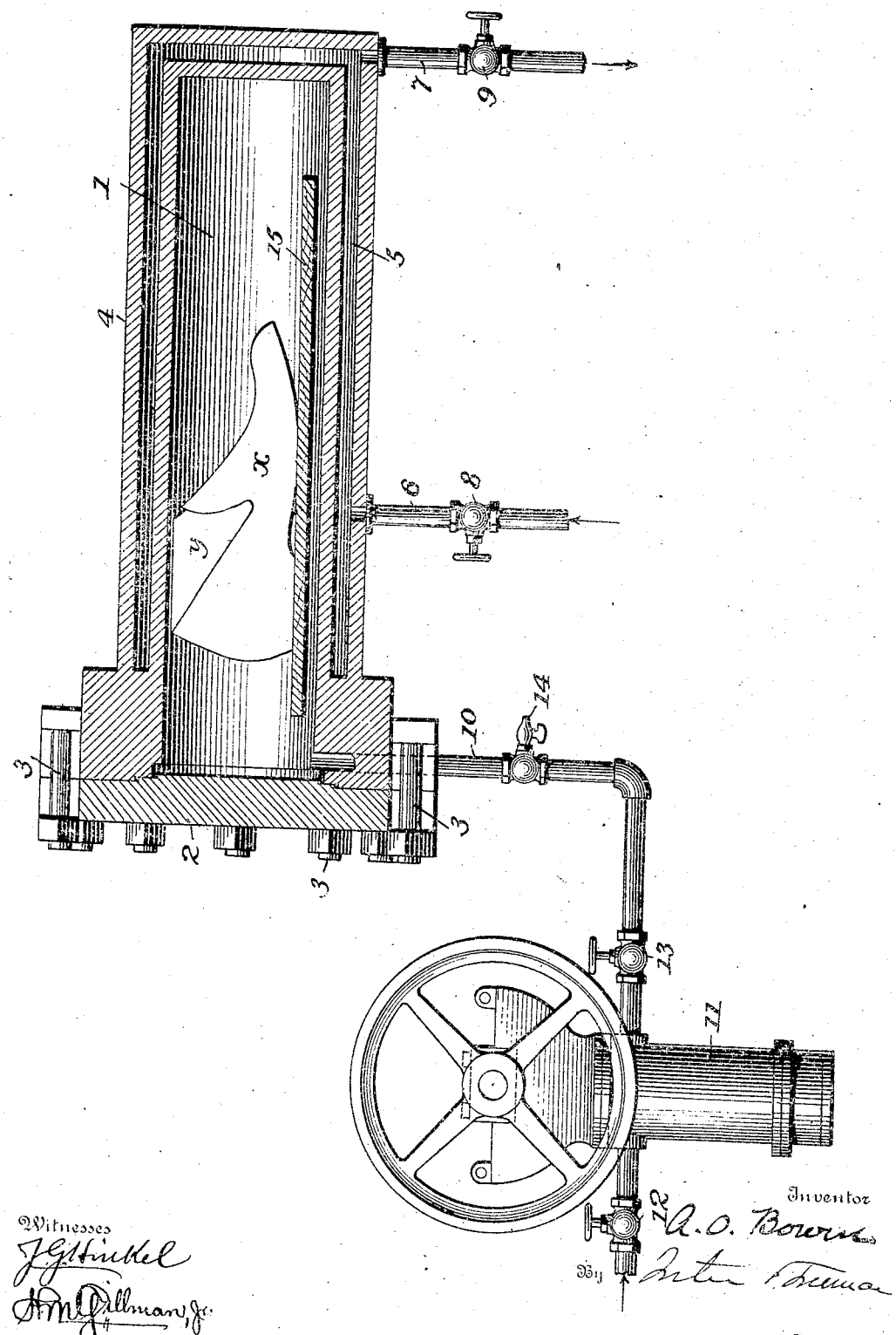

AUGUSTUS O. BOURN, OF BRISTOL, RHODE ISLAND.

PROCESS OF VULCANIZATION.

No. 876,431.  Specification of Letters Patent.  Patented Jan. 14, 1908.

Application filed December 24, 1900. Serial No. 40,926.

*To all whom it may concern:*

Be it known that I, AUGUSTUS O. BOURN, a citizen of the United States, residing at Bristol, in the county of Bristol and State of Rhode Island, have invented a certain new and useful Process of Vulcanization, of which the following is a specification.

My invention relates to a new and improved process of vulcanization, and has for its object to provide an improved process of vulcanizing india-rubber and similar or allied gums, and my invention consists in the improved process or mode of procedure, utilizing the materials set forth in substantially the manner hereinafter described, for producing the results described.

Referring to the drawing forming part of this specification I have illustrated therein one means by which my improved process may be carried out, in which there is shown in cross-section a vessel or chamber in which the vulcanization takes place, together with connections for supplying the same with heat, and means for applying pressure to air.

Articles or substances have heretofore been vulcanized chiefly by exposing them to a high degree of artificial heat in a heated chamber, without pressure; to the action of steam in a closed chamber at a pressure considerably above the atmospheric pressure; between heated plates at a great pressure; and also under pressure in molds. The pressure thus applied both strengthens the rubber compound and shortens the period required for vulcanization. There are many articles, however, which it is impracticable to vulcanize in either of the latter three mentioned processes, and such articles are usually vulcanized in a heated chamber without pressure. Among them might be mentioned boots and shoes, especially such as have a bright surface produced by the application of varnish before vulcanization.

Broadly stated, my invention consists in a process of vulcanization in which the articles or substances to be vulcanized are exposed to the action of atmospheric air, whereby the advantages derived from curing under pressure in the methods heretofore employed are secured for such articles or substances as have been usually vulcanized in a heated chamber without pressure. Also many articles heretofore vulcanized in steam as hereinbefore described can be treated by my process with better results.

In carrying out my invention it is not necessary that the air should be heated to so high a temperature as is now employed in heated chambers without pressure, in order that the process of vulcanization may be accomplished in a reasonable time while the degree of temperature may vary within comparatively wide limits, depending upon many circumstances, as the character of the articles or substances being vulcanized, the pressure of the air. I have found that a temperature varying from 220° to 300° F. is satisfactory in most instances. It is also desirable that the air should be under pressure considerably greater than atmospheric pressure, and greater than the pressure due to the expansion by heat, and while the degree of pressure may vary within comparatively wide limits, depending upon the specific application of the process to particular articles or substances under varying conditions, I have found that a pressure of from 5 to 100 pounds per square inch is satisfactory.

Referring now to the drawing, wherein I have illustrated a form of apparatus which I have used in carrying out my invention, there is a retort or chamber or receptacle, 1, which is preferably made of metal, and this chamber is of a shape and size adapted to receive one or more of the articles or materials to be vulcanized, and is closed in some suitable manner, as by a door, 2, which in the present instance is adapted to closely fit the opening of the chamber and to be secured thereto in any suitable way, as by bolts, 3, so as to make the chamber or retort air- or gas- tight. The chamber 1, is surrounded by an outer jacket, 4, which in the present instance is formed integral with the chamber, 1, and incloses the sides and one end of the chamber, forming a space, 5, between the walls of the chamber and the jacket, 4, and this construction furnishes a convenient means for heating the chamber, 1, and I have shown connected with the space 5, pipes 6 and 7, each provided with a suitable valve, as 8 and 9, and adapted to be connected to some suitable source of supply of heating material, as steam, which may be utilized to produce the desired degree of heat.

Connected to the chamber, 1, is a pipe, 10, which is also connected to some suitable source of supply of air, and I have shown it as connected to a pump, 11, and as being supplied with suitable stop-cocks, 12, 13, and a relief valve, 14, by means of which air may be supplied to the chamber, 1, under suitable or desired pressure, and this pressure maintained in the chamber, 1, independent of the pressure due to the expansion of the air by heat. In the chamber, 1, is preferably provided a platform, 15, for supporting the articles or substance to be vulcanized.

The manner of carrying out the process with the apparatus shown will be largely understood from what has been stated, and it may be said that the article or articles to be vulcanized represented as x, are placed upon the platform, 15, and the door, 2, tightly closed and the pump being set in operation the air is supplied to the chamber, 1, under the desired pressure, and steam or other heated material is supplied through the pipe, 6, to the space, 5, so as to maintain the air at the desired temperature. These sources of supply can be properly regulated by the cocks or otherwise and the articles or substances are vulcanized and then removed from the chamber and the operation is repeated. It, of course, follows that there is no air pressure within the chamber at the time that the articles are inserted, and it is only after the chamber is closed that the air is subjected to pressure above that of the atmosphere and gradually raised, and this raising of the pressure will depend upon the relative sizes of the vulcanizer and the pump. It will further be evident that the air cannot at once acquire the desired temperature, and that the temperature of the air is therefore gradually raised to the vulcanizing point, and in some cases, after a suitable temperature is secured the beneficial result is obtained by reducing the air pressure.

As before intimated, the degree of temperature maintained can be regulated and varied according to circumstances at about the limits above set forth, and the pressure on the air in the chamber can also be regulated and varies as heretofore stated. As a rule it is better to vulcanize at a relatively low temperature and high pressure than at a relatively high temperature and low pressure. When both temperature and pressure are high the vulcanization proceeds too rapidly for most articles.

I claim as my invention,—

1. The process of vulcanizing consisting in exposing the articles to the action of a surrounding body of air, gradually increasing the temperature of the air, and also gradually increasing the pressure of the air to a pressure above that resulting from expansion by heat.

2. The within described process of vulcanizing consisting in subjecting articles to a surrounding body of air, increasing the pressure of the air to a pressure above that due to expansion by heat, and gradually heating the air to a vulcanizing temperature.

3. The within described process of vulcanizing articles consisting in subjecting the same to a surrounding body of air, gradually heating the air to a vulcanizing temperature, and imparting pressure to the air in excess of that due to expansion by heat.

4. In the vulcanization of vulcanizable compounds, subjecting articles made of such compounds to the action of a body of air the pressure and temperature of which is gradually increased, and thereafter reducing the pressure before the operation is completed.

In testimony whereof I have signed my name to this specification in the presence of two subscribing witnesses.

AUGUSTUS O. BOURN.

Witnesses:
FRANK R. MCKENNA,
AUGUSTUS O. BOURN, Jr.